(12) United States Patent
Williams

(10) Patent No.: US 7,730,722 B2
(45) Date of Patent: Jun. 8, 2010

(54) LOW POWER HMT WITH BY-PASS VALVE

(75) Inventor: Keith R. Williams, Minnetonka, MN (US)

(73) Assignee: Sauer-Danfoss Inc., Ames, IA (US)

(*) Notice: Subject to any disclaimer, the term of this patent is extended or adjusted under 35 U.S.C. 154(b) by 309 days.

(21) Appl. No.: 11/931,741

(22) Filed: Oct. 31, 2007

(65) Prior Publication Data

US 2009/0107135 A1 Apr. 30, 2009

(51) Int. Cl.
*F16D 39/00* (2006.01)
(52) U.S. Cl. ........................................... 60/489
(58) Field of Classification Search ............... 60/489
See application file for complete search history.

(56) References Cited

U.S. PATENT DOCUMENTS 3,672,168 A * 6/1972 Salmon ............... 60/489
3,865,514 A 2/1975 Lonnemo
4,488,456 A 12/1984 Taga et al.
4,512,723 A 4/1985 Williams
5,016,496 A 5/1991 Sugano
5,111,719 A 5/1992 Okahara
6,022,293 A 2/2000 Dourra et al.
6,436,001 B1 8/2002 Sakai et al.
6,622,484 B2 * 9/2003 Hopkins ............... 60/489
2006/0254268 A1 11/2006 Yasuda et al.

FOREIGN PATENT DOCUMENTS

| JP | 05240343 | 9/1993 |
| JP | 2002002594 | 1/2002 |
| JP | 2005114160 | 4/2005 |

* cited by examiner

*Primary Examiner*—F. Daniel Lopez

(57) ABSTRACT

A method of operating a vehicle with a hydrostatic circuit. The method includes providing a hydrostatic circuit having first and second hydraulic kits that are fluidly connected to one another by first and second fluid lines. A by-pass valve is placed between the first and second hydraulic lines and is controlled in order to actuate the by-pass valve when certain predetermined conditions are present in order to relieve pressure within the hydrostatic circuit.

8 Claims, 4 Drawing Sheets

US 7,730,722 B2

LOW POWER HMT WITH BY-PASS VALVE

BACKGROUND OF THE INVENTION

This invention relates to vehicles powered by hydromechanical transmissions. More specifically this invention relates to an improved hydrostatic circuit with a by-pass valve and method of using the same.

When a vehicle is suddenly stopped due to an external force such as a curb, log, brakes or the like the transmission ratio must either be reduced quickly toward zero or secondary means must be incorporated to unload torque transfer between the transmission and the engine. In a hydromechanical transmission when sudden vehicle loading occurs the hydraulic pressure on one side of the recirculating flow path between the hydraulic rotating kit rises quickly. During braking or other external means to stop the vehicle, the torque transfer results in a sudden loading of the engine which tends to decrease engine speed. If the load is too high the engine stops running or is killed, especially at low throttle settings when the engine output torque levels are at their lowest levels.

A hydromechanical transmission (HMT) or hydrostatic transmission (HST) subjected to fast changing load conditions of stopping and starting must have a means to prevent transmitting torque settings from the vehicle drive train to the engine output shaft when the vehicle throttle is set at low power settings. Changing load conditions are normally handled to maintain engine speed by adjusting the HMT or HST ratio setting or by including a clutching mechanism between the engine and transmission at low speeds. Sometimes in practice a reversing mechanism such as a one way clutch is included to allow the transmitting of torque back to the engine in a first direction. This tends to speed up the engine in the first direction but in an opposite direction prevents the engine from slowing down.

In general this practice keeps the engine from being loaded by the transmission in a way that it would kill the engine. However the disadvantage of the clutch is that it allows vehicle free wheeling in the opposite direction. Additionally because a clutch is friction based it is prone to wear resulting in loss of torque transfer ability and eventual failure.

The option of adjusting the HMT or HST ratio to prevent killing the engine also has disadvantages. Specifically some conditions require a response that is faster than the ratio setting hardware is capable of providing. The logic must decide if the adjustment should be to reduce or increase the ratio and this decision requires knowledge of the direction the torque needs to be transmitted between the engine and transmission in order to provide the needed breaking to prevent the engine kill. Therefore the direction that the ratio needs to be adjusted depends upon operator input, deceleration requirements and external loading due to application of brakes and/or terrain.

Therefore a principal object of the present invention is to provide an improved method of operating a hydrostatic circuit to avoid killing an engine under predetermined conditions.

Yet another object of the present invention is to prevent free wheeling of a vehicle.

Another object of the present invention is to provide a hydrostatic circuit that eliminates the need for a clutch.

These and other objects, features, or advantages of the present invention will become apparent from the specification and claims.

BRIEF SUMMARY OF THE INVENTION

A method of operating a vehicle with a hydrostatic circuit. The method includes providing the hydrostatic circuit that has a first hydraulic kit that is fluidly connected to a second hydraulic kit via first and second fluid lines. The hydrostatic circuit additionally has a by-pass valve connected in parallel to the first and second hydraulic kits via the first and second fluid lines. The by-pass valve is then controlled such that the valve opens when a predetermined condition is present in order to relieve pressure in the hydrostatic circuit.

DETAILED DESCRIPTION OF THE PREFERRED EMBODIMENT OF THE INVENTION

Figure 1:
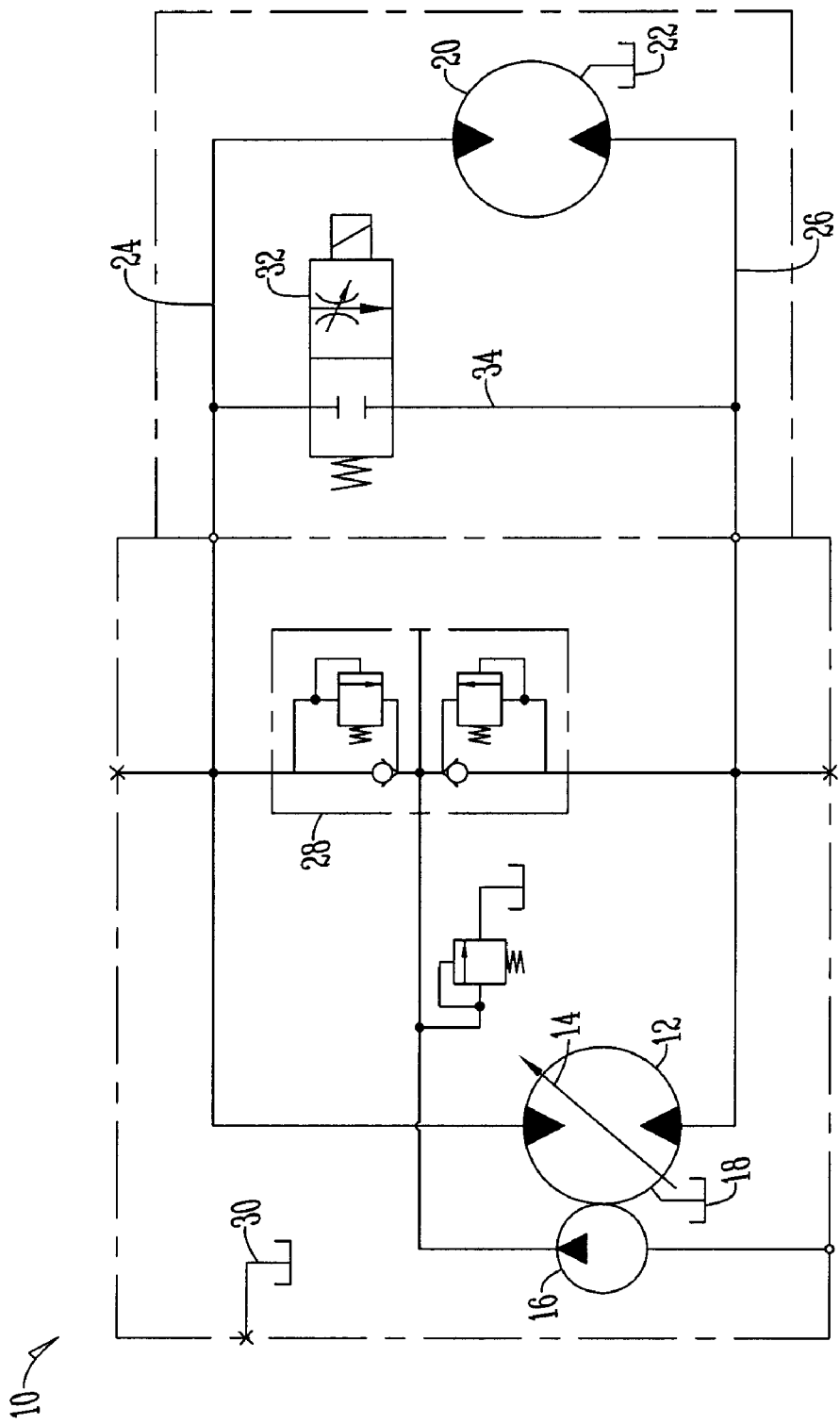
FIG. 1 is a schematic diagram of a hydrostatic circuit.
Figure 2:
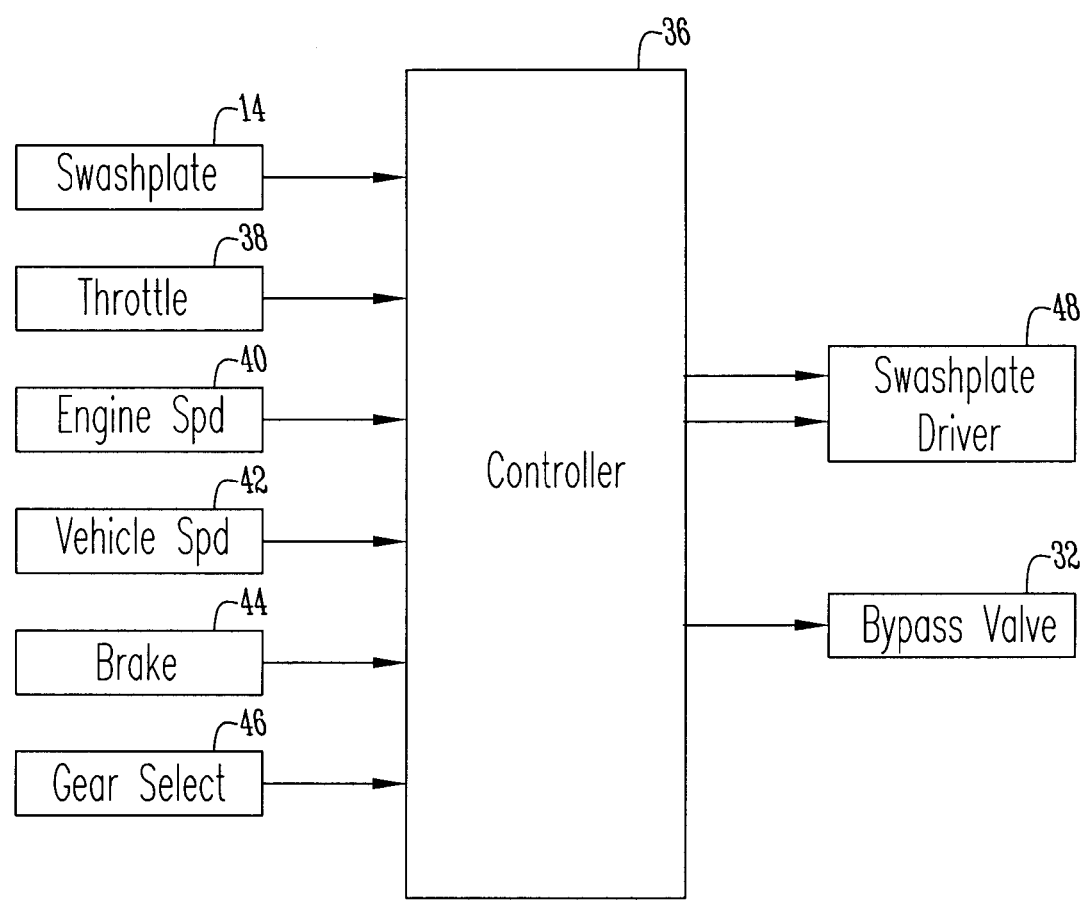
FIG. 2 is a schematic diagram of a control circuit for a hydrostatic circuit.

FIG. 1 shows a hydrostatic circuit 10 that is typically used in combination with an engine to drive the wheels of a vehicle such as a fork lift, skid loader or the like. The hydrostatic circuit 10 has a first hydraulic kit 12 such as a hydraulic pump that has a swash plate 14 and is connected to a charge pump 16 and in fluid communication with an oil reservoir 18 as is known in the art. The first hydraulic kit 12 is in fluid communication with a second hydraulic kit or motor 20 that similarly is fluidly connected to an oil reservoir 22. The hydraulic kits or pump and motor 12 and 20 are fluidly connected by first and second fluid lines 24 and 26. The first and second fluid lines 24 and 26 are also fluidly connected to a check valve system 28 wherein additional fluid from a reservoir 30 may be provided to the hydrostatic circuit via the charge pump 16.

Additionally fluidly connected between the first and second hydraulic kits is a by-pass valve 32. Specifically by-pass valve 32 is fluidly connected to the hydraulic kits 12 and 20 in parallel within a by-pass fluid line 34 that fluidly connects between the first and second fluid lines 24 and 26.

The by-pass valve 32 in one embodiment may be a digital device or valve as is known in the art. Alternatively, the by-pass valve 32 may be a proportional valve that is electrically connected to a controller 36 for desired actuation. By placing a by-pass valve in parallel between the first and second hydraulic kits 12 and 20, when the valve opens between the first and second hydraulic lines 24 and 26, pressure is relieved within the system. Thus the torque is lowered that is passing through the hydraulic leg of the hydromechanical transmission regardless of swash plate angle and the speed of the two hydraulic kits making up the hydraulic leg of the HMT.

In a preferred embodiment the by-pass valve 32 is a proportional by-pass valve that is electrically connected to controller 36. Controller 36 receives inputs from the swash plate 14, throttle 38, engine speed 40, vehicle speed 42, brake 44 and gear select 46 in order to control and operate the hydrostatic circuit 10. Specifically by monitoring all of these inputs the controller is able to send signals to the swash plate driver 48 and by-pass valve 32 in order to operate the hydrostatic circuit 10.

In operation when by-pass valve 32 is opened, hydraulic pressure within the circuit 10 is relieved thus limiting the torque loading subject to the engine. The amount of the opening of the by-pass valve is controlled by monitoring two variables. The first is the hydromechanical transmission ratio percentage as defined by the swash plate 14 position of the first hydraulic kit 12 or variable hydraulic unit. The second is the actual vehicle ratio percentages defined as the relative speed of the vehicle and the engine speeds along with a constant scaling parameter to adjust for gearing so that the scale of the hydromechanical transition ratio percentage and vehicle ratio percentage are the same.

After opening the by-pass valve 32, once the hydromechanical transmission ratio percentage is returned to zero the by-pass valve 32 can be closed based upon vehicle ratio percentage only. If the vehicle is stopped closing the by-pass valve 32 may be done quickly since the flow through the valve is small. However, if the vehicle is moving due to vehicle dynamics or grade upon which the vehicle is on such as when the vehicle is on a hill, then closing the by-pass valve 32 must be regulated to close slowly. Specifically the rate of closure must be adjusted to maintain a stopping torque on the vehicle through the transmission. However, the stopping torque cannot be so high that it exceeds the engine braking torque level that would cause either raising engine speed or the killing of the engine. Because the by-pass valve 32 works in both directions, fluid flow goes from the high side of the hydraulic loop to the low side regardless of the direction of vehicle movement or loading.

Operation of the by-pass valve is limited to a set of predetermined conditions that are present wherein the valve 32 needs to be actuated to relieve pressure within the hydrostatic circuit. One predetermined condition occurs during normal deceleration. During normal deceleration the hydromechanical transmission ratio can be above zero percent when the engine reaches its start up speed. The vehicle is also moving meaning that the actual vehicle ratio is also above zero percent. Thus either the engine, the transmission, or drive line must absorb any torque from the wheels needed to stop the vehicle in passing through the transmission to the engine. Specifically the speed at which a vehicle moves is dependent upon the hydromechanical transmission ratio and external loading such as the grade of a hill and/or vehicle weight translated to momentum by vehicle speed and grace. The control of the hydromechanical transmission is normally limited to provide smooth deceleration. Under this condition the amount of by-pass valve opening is determined by the difference between hydromechanical transmission ratio and actual vehicle ratio. If the difference is greater than a predefined offset amount, then the by-pass valve is opened proportionally to the amount of difference above the predefined amount.

In this implementation of the by-pass valve logic, when engine speed reaches a low idle speed setting, the by-pass valve is opened by the amount of difference between the hydromechanical transmission ratio and vehicle speed ratio with respect to engine speed until the hydromechanical transmission ratio reaches zero percent. Following this point in time the by-pass valve flow area is opened to a level determined by the vehicle speed ratio with respect to engine speed.

At a predetermined setting amount of the ratio between vehicle speed ratio and engine speed the by-pass valve is closed completely. This ratio is predetermined as the level at which the engine dynamic torque is adequate to continue decelerating the vehicle without resulting in killing the engine. By delaying the by-pass valve opening to the point below the low target engine speed the engine can be used to provide engine braking down to the speed at which the engine braking is minimal at low throttle position.

The by-pass valve 32 is also used to limit the amount of vehicle speed on hills. Vehicles tend to speed up when going down hill with the by-pass valve open. When the speed of the vehicle reaches a predetermined amount the by-pass valve 32 that normally would be opening with increasing vehicle speed ratio with respect to engine speed, can be commanded to close as vehicle ratio increases further. This provides hydraulic braking and works to limit the vehicle speed on hills with having minimal effect on engine speed.

Another predetermined condition for opening the by-pass valve 32 occurs when the operator does a hard braking operation while letting off the throttle such as a panic stop. When engine speed, vehicle speed, throttle command and engine deceleration all indicate that a panic stop is being applied, the by-pass valve 32 is opened. The amount the valve is opened is then determined by the difference in transmission ratio and the vehicle speed ratio with respect to engine speed.

In conjunction with the panic stop, the control logic additionally resets the hydromechanical transmission ratio command percentage to a lower level than the actual vehicle speed ratio by a predetermined amount. This unloads the engine by quickly getting the transmission ratio closer to zero percent. This also matches transmission ratio percentage closer to the actual physical vehicle speed ratio percentage so that the amount of flow across the by-pass valve 32 is only temporarily large than quickly reduced to a smaller level as the positioning of the swash plate 14 were closely matches the command which now is leading to the vehicle speed ratio of zero percent.

If a throttle recovery is initiated prior to the stopping of the vehicle during a panic stop, the swash plate 14 is already back shifted to a position to allow engine speed to recover but not too far as to result in a delay in acceleration by the vehicle. These two operations together prevent the engine from killing during panic stops.

Yet another predetermined condition is when the engine is not running and the by-pass valve 32 must be opened to allow vehicle movement. Specifically when a hydromechanical transmission ratio is not at zero percent by opening the by-pass valve 32 the vehicle is allowed to move so that the gears can be shifted. However, because the amount of vehicle speed needs to be limited, the amount of opening is reduced as vehicle speed increases. The internal leakage of the hydraulic kits 12 and 20 allows vehicle movement, however the vehicle speed is limited by the by-pass valve opening.

Another predetermined condition occurs when a vehicle attempts to reacquire vehicle propel following another predetermined condition that opens the by-pass valve 32. This requires that the by-pass valve 32 be closed in time. Closing the valve immediately under low acceleration conditions with minimal throttle input would result in a significant jerk as the by-pass valve flow drops suddenly. This would result in a rapid increase in new pressure and therefore torque increase through the transmission. Additionally if a large change in throttle is given then the operator is wanting a rapid increase in torque to be transmitted through the hydromechanical transmission in order to produce a high rate of vehicle acceleration. Therefore the closure of the by-pass valve 32 during throttle reacquisition is controlled by the amount of throttle command. The larger the throttle command the shorter the time it takes to close the by-pass valve from a given opening. Once the valve 32 is closed no further action is needed. The time taken for the by-pass valve to close following a given throttle command increase is longer if the by-pass valve is open more than from a condition in which it is not open as much.

Figure 3:
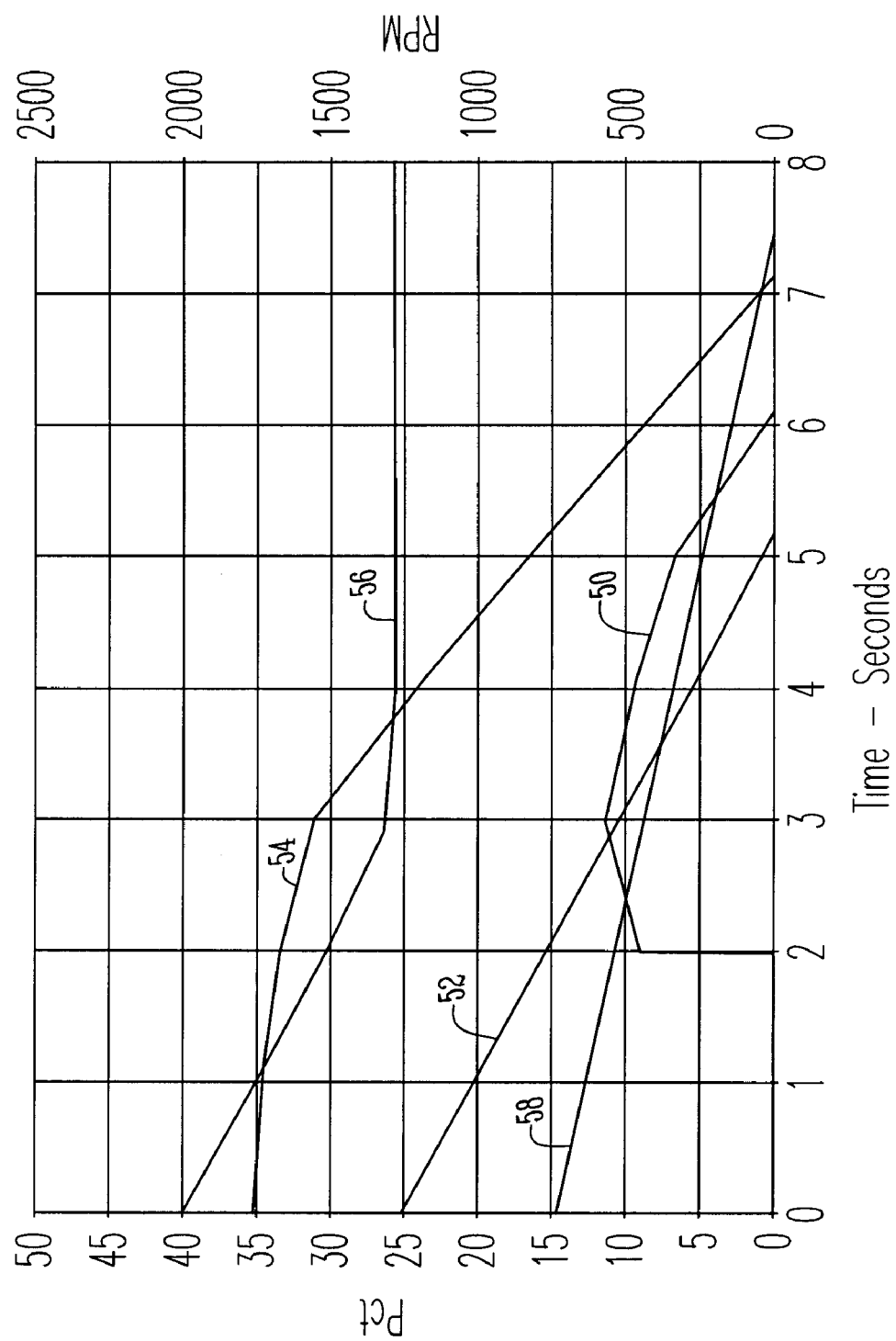
FIG. 3 is a graph showing a by-pass valve opening as a function of engine rpm and vehicle rpm wherein the x axis is time measured in seconds and the y axes' are percentage and rpm.
Figure 4:
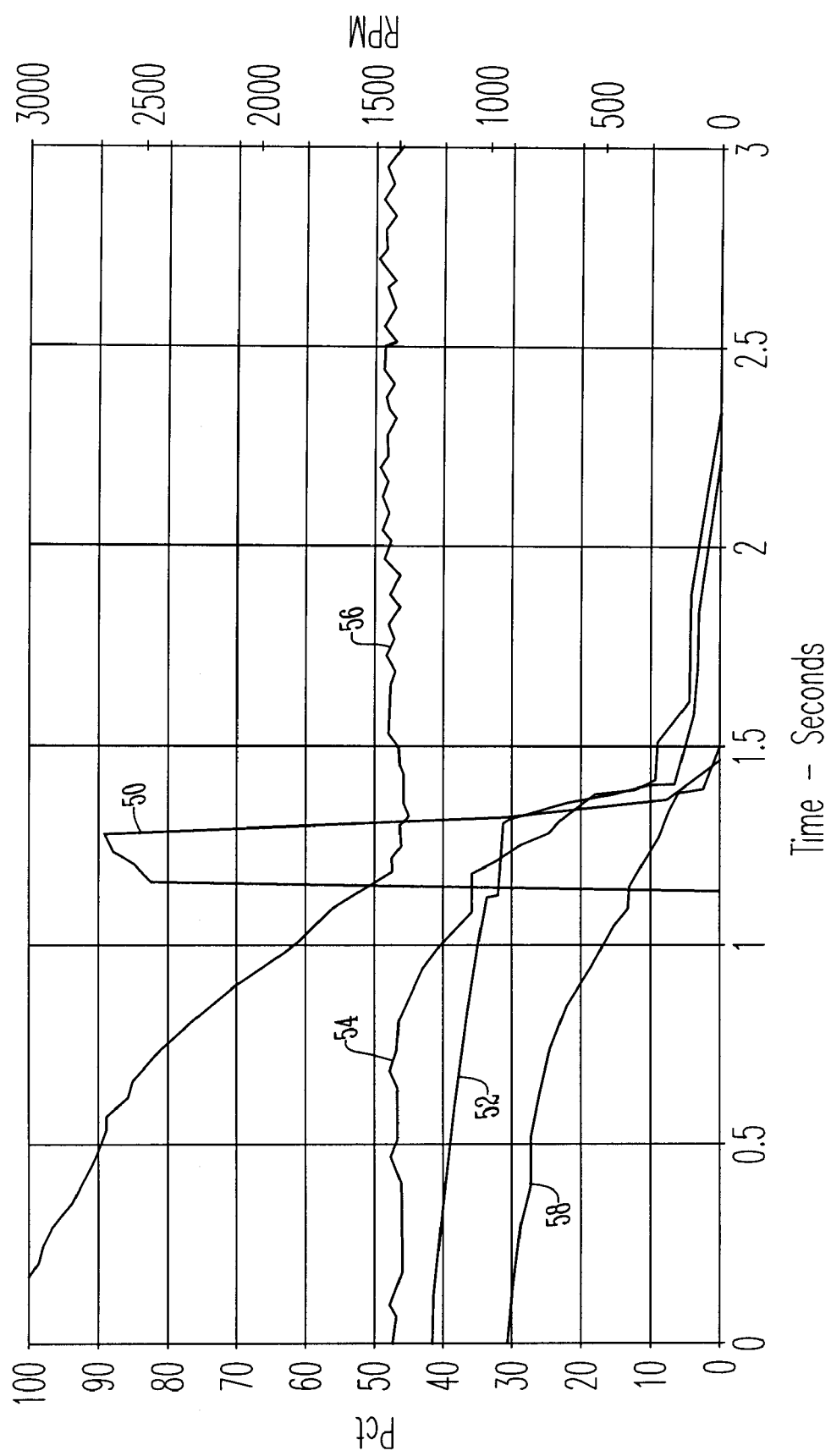
FIG. 4 is a graph showing a by-pass valve opening as a function of engine rpm and vehicle rpm wherein the x axis is time measured in seconds and the y axes are percentage and rpm.

FIGS. 3 and 4 show graphic illustrations of operating conditions of a vehicle that has a hydrostatic circuit using the by-pass valve 32. The x axis of the graphs represents time in the amount of seconds while the y axis on the left hand side of the graph represents percentage and on the right hand side of the graph represents revolutions per minute or rpms. Specifically the graphs show by-pass valve percentage 50, hydromechanical transmission ratio percentage 52 and actual vehicle ratio percentage 54 with respect to time and additionally engine speed 56 and vehicle speed 58 measured in rpms with regard to time. FIG. 3 shows a deceleration using the by-pass valve while FIG. 4 shows hard braking or a panic stop. In both instances by use of the by-pass valve, the engine speed and vehicle speed are maintained accurately without killing an engine.

Thus an improved method of operating a vehicle having a hydrostatic circuit is provided. With the use of the by-pass valve 32, the valve itself can serve to replace the same function as a clutch with the added advantage of providing engine braking torque in both directions of movement. By eliminating the clutch the disadvantage of wear and eventual failure and replacement of the clutch is presented. The by-pass valve controls the relative pressure between the two sides of a closed loop circuit to limit the amount of torque between the engine and the vehicle drive wheels from within the hydromechanical transmission or hydrostatic transmission. As a result, free wheeling is limited and an improved operation is provided. As a result at the very least all of the stated objectives have been met.

It will be appreciated by those skilled in the art that other various modifications could be made to the device without the parting from the spirit and scope of this invention. All such modifications and changes fall within the scope of the claims and are intended to be covered thereby.

What is claimed is:

1. A method of operating a vehicle with a hydrostatic circuit comprising:
   providing said hydrostatic circuit having a first hydraulic kit fluidly connected to a second hydraulic kit via first and second fluid lines;
   providing a by-pass valve disposed between and fluidly connected to the first and second fluid lines;
   actuating the by-pass valve when a predetermined condition is present to relieve pressure in the hydrostatic circuit; and
   wherein the predetermined condition is wherein a difference between a hydromechanical transmission ratio and actual vehicle speed ratio is greater than a predefined offset amount.

2. The method of claim 1 wherein the by-pass valve is opened proportionately to the difference greater than the predetermined offset amount.

3. The method of claim 1 wherein actuating a throttle causes the request for a rapid increase in torque.

4. The method of claim 1 wherein a controller is electrically connected to the by-pass valve to actuate the valve.

5. The method of claim 4 wherein the by-pass valve is a proportional valve.

6. The method of claim 1 wherein the by-pass valve is a digitally controlled valve.

7. A method of operating a vehicle with a hydrostatic circuit comprising:
   providing said hydrostatic circuit having a first hydraulic kit fluidly connected to a second hydraulic kit via first and second fluid lines;
   actuating the by-pass valve when a predetermined condition is present to relieve pressure in the hydrostatic circuit;
   wherein the predetermined condition is wherein the vehicle is commanded to stop; and
   wherein the by-pass valve is opened proportionately to a difference between HMT ratio and actual vehicle speed ratio.

8. A method of operating a vehicle with a hydrostatic circuit comprising:
   providing said hydrostatic circuit having a first hydraulic kit fluidly connected to a second hydraulic kit via first and second fluid lines;
   providing a by-pass valve disposed between and fluidly connected to the first and second fluid lines;
   actuating the by-pass valve when a predetermined condition is present to relieve pressure in the hydrostatic circuit;
   wherein the predetermined condition is wherein an engine of the vehicle is not operating; and wherein the by-pass valve is opened proportionately to vehicle speed.

\* \* \* \* \*